(12) United States Patent
O'Donnell

(10) Patent No.: US 7,499,051 B1
(45) Date of Patent: *Mar. 3, 2009

(54) GPU ASSISTED 3D COMPOSITING

(75) Inventor: Daniel O'Donnell, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/118,216

(22) Filed: Apr. 29, 2005

(51) Int. Cl.
*G06T 15/40* (2006.01)

(52) U.S. Cl. ............... 345/421; 345/501; 345/522; 345/604; 345/629; 345/634; 382/294

(58) Field of Classification Search ............... 345/421, 345/501, 522, 604, 629, 634; 382/294
See application file for complete search history.

(56) References Cited

U.S. PATENT DOCUMENTS

| 5,579,454 | A | * | 11/1996 | Billyard et al. ............. 345/421 |
| 5,675,773 | A | * | 10/1997 | Devic ......................... 345/522 |
| 5,764,795 | A | | 6/1998 | Takeo et al. |
| 5,881,211 | A | | 3/1999 | Matsumura et al. |
| 5,943,058 | A | | 8/1999 | Nagy |
| 6,016,150 | A | | 1/2000 | Lengyel et al. |
| 6,028,583 | A | | 2/2000 | Hamburg |
| 6,466,210 | B1 | | 10/2002 | Carlsen et al. |
| 6,693,644 | B1 | | 2/2004 | Moriwaki et al. |
| 6,717,567 | B1 | | 4/2004 | Bowden, III et al. |
| 6,809,745 | B1 | | 10/2004 | O'Donnell et al. |
| 2002/0003541 | A1 | * | 1/2002 | Boyd et al. ............... 345/501 |
| 2004/0190617 | A1 | | 9/2004 | Shen et al. |
| 2005/0031199 | A1 | | 2/2005 | Ben-Chorin et al. |
| 2005/0271302 | A1 | * | 12/2005 | Khamene et al. ........... 382/294 |
| 2006/0282604 | A1 | | 12/2006 | Temkine et al. |

OTHER PUBLICATIONS

Foley, James D., "List-Priority Algorithms", (Book)—Computer Graphics Principles and Practice, 2nd Edition in C, (1997) pp. 672-680.*
Meyer, Trish, et al., "Creating Motion Graphics with after effects", vol. 1: The Essentials, 3rd Edition, CMP Books, p. 34.*
Abram, Gregory D., et al., "Building block shaders", *Proceedings of the 17th Annual Conference on Computer Graphics and Interactive Techniques*, (1990),283-288.
Adobe, "Adobe After Effects", *Adobe After Effects 5.5 Effect PDFs*, Table of effects in after effects 5.5,1-5.

(Continued)

*Primary Examiner*—Kimbinh T Nguyen
(74) *Attorney, Agent, or Firm*—Schwegman, Lundberg & Woessner, P.A.

(57) ABSTRACT

A method to perform compositing of three-dimensional images includes, on a Central Processing Unit (CPU), automatically assembling a Graphics Processing Unit (GPU) program for each element of a plurality of image elements. The GPU program for each element is to apply at least one effect to the respective image element, and to composite the respective image element according to a compositing mode specific to the respective image element. The plurality of image elements, and the associated GPU programs, is communicated from the CPU to a GPU. The plurality of image elements may be subject to a two-pass sort operation prior to the automatic assembly of the GPU programs.

22 Claims, 9 Drawing Sheets

OTHER PUBLICATIONS

Adobe, "Chapter 7—Transparency", *PDF Reference, Fifth Edition, Version 1.6*, http://partners.adobe.com/public/developer/pdf/index_reference.html#5,(2004),4 83-545.
Adobe, "Effects, part 1", *Adobe After Effects 5.0*, 1-45.
Adobe, "Effects, part 2", *Adobe After Effects 5.0*, 1-31.
Adobe, "Effects, part 3", *Adobe After Effects 5.0*, 1-20.
Adobe, "Effects, part 4", *Adobe After Effects 5.0*, 1-32.
Adobe, "Effects, part 5", *Adobe After Effects 5.0*, 1-26.
Adobe, "Effects, part 6", *Adobe After Effects 5.0*, 1-29.
Adobe, "Effects, part 7", *Adobe After Effects 5.0*, 1-13.
Bardens, Ben, "After Effects Using Track Mattes", *Editors Guild Magazine*, Reprinted from The Editors Guild Magazine vol. 24, No. 2-Mar./Apr. 2003,1-4.
Berger, Christopher, "A Flexible Framework for Hardware-Accelerated High-Quality Volume Rendering", *Technical Report TR-VRVis-2003-001, VRVis Research Center*, (2003), 1-10.
Birn, Jeremy, "Render Passes, Layers, and 3D Compositing", *3d Compositing at 3rRender.com*, http://www.3drender.com/light/compositing/, From the book Digital Lighting & Rendering,(2000), 1-4.
Blinn, J F., "Compositing. 1. Theory", *IEEE Computer Graphics & Applications*, 14(5), (Sep. 1994),83-87.
Blinn, J F., "Composting, part 2: practice", *IEEE Computer Graphics and Applications*, 14(6), (Nov. 1996),78-82.
BSP-FAQ, "Binary Space Partitioning Trees FAQ", http://www.faqs.org/faqs/graphics/bsptree-faq/, (Sep. 26, 1995), Web Page.
Callahan, Steven P., "Hardware-Assisted Visibility Sorting for Unstrucred Volume Rendering", *SCI Institute Technical Report.*, The University of Utah,(Jun. 14, 2004), 1-9.
Carpenter, Loren, "The A -buffer, an antialiased hidden surface method", *International Conference on Computer Graphics and Interactive Techniques, Proceedings of the 11th annual conference on Computer graphics and interactive techniques*, (1984), 103-108.
Chin, Norman, et al., "Near real-time shadow generation using BSP trees", *Proceedings of the 16th Annual Conference on Computer Graphics and Interactive Techniques*, (Jul. 1989),99-106.
Chrysanthou, Y, et al., "Computing Dynamic Changes to BSP Trees", *Eurographics '92 Proceedings*, 11(3), (Sep. 1992),321-332.
Crow, Franklin C., "Shadow algorithms for computer graphics", *International Conference on Computer Graphics and Interactive Techniques, Proceedings of the 4th annual conference on Computer graphics and interactive techniques*, (1977),242-248.
Dachille, Frank, "Architectures for Realistic Volume Imaging", *Preliminary Exam, SUNY at Stony Brook*, (1999),1-63.
Elinas, Pantelis, "Real-time rendering of 3D clouds", *Journal of Graphics Tools*, 5(4), (Nov. 2000),33-45.
Everitt, Cass, "Interactive Order-Independent Transparency", http://developer.nvidia.com/object/Interactive_Order_Transparency.html, (May 15, 2001),1-11.
Foley, James D., "List-Priority Algorithms", *(Book)—Computer Graphics : Principles and Practice*, 2nd Edition,(1990),672-680.
Franklin, Curt, "How 3-D Graphics Work", http://computer.howstuffworks.com/3dgraphics.htm/printable, 1-11.
Fuchs, Henry, et al., "Near real-time shaded display of rigid objects", *Proceedings of the 10th Annual Conference on Computer Graphics and Interactive Techniques*, (1983),65-72.
Fuchs, Henry, et al., "On Visible Surface Generation by A Priori Tree Structures", *Computer Graphics, SIGGRAPH '80*, (1980),124-133.
Fuchs, Henry, et al. "Predeterming Visibility Priority in 3-D Scenes", *Computer Graphics, SIGGRAPH '79*, 13(2), (Aug. 1979),175-181.
Guenter, Brian, et al., "Specializing shaders", *Proceedings of the 22nd Annual Conference on Computer Graphics and Interactive Techniques*, (1995),343-350.
McCool, Michael, et al., "Shader Algebra", *ACM Transactions on Graphics (TOG), Special Issue: Proceedings of the 2004 SIGGRAPH Conference*, 23(3), (2004),787-795.
Porter, Thomas, et al., "Compositing digital images", *International Conference on Computer Graphics and Interactive Techniques, Proceedings of the 11th annual conference on Computer graphics and interactive techniques*, (1984),253-259.
Stewart, Nigel, "Real-Time Rendering and 3D Games Programming", *COSC1224/1226, RMIT School of Computer Science and Information Technology*, (Sep. 25, 2003),1-40.
Thomas, Spencer W., "Decomposing a Matrix Into Simple Transformations", *In: Graphics Gems II by James Arvo*, Boston : Academic Press,(1991),320-323.
U.S. Appl. No. 11/117,944 Non-Final Office Action mailed Jun. 18, 2007, 15 pgs.
Foley, J. D., et al., "The Systems Programming Series", *Computer Graphics Principles and Practice,2nd Edition in C*, Second Edition in C,(1997),203,207,208,835.
Shreiner, Dave, "OpenGL reference manual : the official reference document to OpenGL, version 1.2 /", *Reading, MA : Addison-Wesley*, 3rd Edition,(2000),683 Pages.
"U.S. Appl. No. 11/117,944, Response filed Mar. 26, 2008 to Non-Final Office Action mailed Jun. 18, 2007", 11 pgs.
"U.S. Appl. No. 11/117,944, Non-Final Office Action mailed Nov. 26, 2007", 6 pgs.
"U.S. Appl. No. 11/117,944, Response filed Sep. 11, 2007 to Non-Final Office Action mailed Jun. 18, 2007", 11 pgs.
"U.S. Appl. No. 11/189,372, Non-Final Office Action mailed in Jul. 30, 2007", 17 pgs.
"U.S. Appl. No. 11/189,372, Response filed Oct. 29, 2007 to Non-Final Office Action mailed Jul. 30, 2007", 10 pgs.
"U.S. Appl. No. 11/189,372 Final Office Action mailed Feb. 1, 2008", 19 pgs.
"U.S. Appl. No. 11/189,372, Response filed Apr. 3, 2008 to Final Office Action mailed Jan. 29, 2008", 11 pgs.
"U.S. Appl. No. 11/117,944, Final Office Action mailed Jul. 10, 2008.", 5 pgs.
"U.S. Appl. No. 11/117,944, Notice of Allowance mailed Aug. 27, 2008", 6 pgs.
"U.S. Appl. No. 11/117,944, Response filed Jul. 31, 2008 to Non Final Office Action mailed Jul. 10, 2008", 8 pgs.
"U.S. Appl. No. 11/189,372 Non-Final Office Action Mailed On Sep. 12, 2008", 21 pgs.
"Game Programming Gems 5", *Game Programming Gems 5, Charles River Media, Inc.*, (2005), 70 pgs.
"GPUGems2—Programming Techniques for High-Performance Graphics and General Purpose Computation", *GPUGems 2—Programming Techniques for High-Preformance Graphics and General-Purpose Computation*, Addison-Wesley, (2005), 46 pgs.
Chartrand, Gary, et al., "Applied and algorithmic graph theory", *New York : McGraw-Hill*, (1993),30 pgs.
McCool, Michael, "Metaprogramming GPUs with Sh", *Wellesley, MA : A K Peters*, Book xvii,,(2004), 60 pgs.
McCool, Michael, "Shader metaprogramming", *Proceedings of the ACM SIGGRAPH/EUROGRAPHICS conference on Graphics hardware*, Revised Paper,(Sep. 1-2, 2002), pp. 1-12.
Rost, Randy, "OpenGLA® Shading Language", *Reading, MA : Addison-Wesley*, (Feb. 20, 2004), 47 pgs.

* cited by examiner

GPU ASSISTED 3D COMPOSITING

TECHNICAL FIELD

The present application relates generally to computer graphics processing, and in one example embodiment to a method and apparatus for processing and/or manipulating data for presentation by a computer system.

BACKGROUND

Recent innovations with respect to Graphics Processing Units (GPUs), and graphics cards hosting GPUs, have enabled increasingly fast image compositing operations. Turning first to two-dimensional compositing operations, these can now typically be performed using shading languages designed to run on a GPU. For example, given a set of images, a compositing order, and a compositing operation for each image, the GPU enables the copying of a background image from a frame buffer to a video memory (e.g., one or more texture processing units) of the GPU. The GPU may then use the background image and associated alpha channel information, along with a foreground texture and associated alpha channel information, to produce another background image in the frame buffer. This process is repeated by the GPU for each foreground image. Complications can arise because of the limited resources of the GPU, and the time required to transfer images to the video memory. Many techniques are employed to minimize the transfer time and storage requirements.

Turning now to three-dimensional compositing, in contrast to two-dimensional compositing, three-dimensional compositing typically presents no fixed sorting order. Instead, the order within each compositing operation needs to be determined from the geometrical position of images (or image elements) within a three-dimensional space. For example, if a ray from a view point passes through two image elements, the first image element "hit" by the ray is the foreground, and the second image element is the background. Complications arise when images intersect, and no clear sorting order exists. In view of the difficulties that are presented with respect to three-dimensional compositing on a GPU, compositing three-dimensional images has typically been performed on a Central Processing Unit (CPU) of a computer system. For example, the Painter's algorithm has been utilized to handle non-intersecting image layers. For intersecting layers, the A-buffer technique has been utilized on the CPU to sort image fragments. A third technique that has been deployed on the CPU is to split images into non-intersecting pieces, and use the Painter's algorithm on these pieces. On broadcast-sized images, these techniques, when implemented on the CPU, are not fast enough to be considered real time.

To accelerate compositing operations, developers have attempted to use the GPU (e.g., through the OpenGL and Direct3D interfaces) to perform certain compositing operations. However, blending equations provided by the interfaces are insufficient to handle a wide variety of compositing modes.

Turning now to GPU processing, certain techniques (e.g., the Painter's algorithm) may run well on the GPU but are unable to process intersecting images. The above-mentioned A-buffer technique, where each pixel in the frame buffer contains a depth-sorted list of fragments, is not well suited for their GPU. Further, typical techniques to render three-dimensional transparent, non-intersecting image layers on the GPU typically require multiple passes through the data, resulting in performance penalties.

In short, previous GPU-assisted techniques for compositing three-dimensional images handled non-intersecting layers satisfactorily, and also satisfactorily computed lights, shadows and other effects. However such techniques did not handle intersections correctly, and only allowed the use of binary trackmattes. Such techniques also required multiple passes of the data. Such additional passes through a three-dimensional scene, to process multiple effects (e.g. lighting, trackmattes, motion blur, etc.), resulted in reduced performance.

SUMMARY

According to a first example aspect, a method to perform compositing of three-dimensional images includes, on a Central Processing Unit (CPU), automatically assembling a Graphics Processing Unit (GPU) program for each element of a plurality of image elements. The GPU program for each element is to apply at least one effect to the respective image element, and to composite the respective image element according to a compositing mode specific to the respective image element. The plurality of image elements, and the associated GPU programs, is communicated from the CPU to a GPU.

According to a second example aspect, there is provided a method to perform sorting with respect to image elements of a digital image, the method comprising processing the digital image to identify a plurality of image elements. A first sort operation is then performed with respect to the plurality of image elements, the first sort operation being based on obscurity among the plurality of image elements. A second sort operation is performed with respect to the plurality of image elements, the second sort operation utilizing a Binary Space-Partitioning (BSP) tree algorithm.

BRIEF DESCRIPTION OF THE DRAWINGS

Embodiments of the invention may be best understood by referring to the following description and accompanying drawings which illustrate such embodiments. In the drawings.

DETAILED DESCRIPTION

Figure 1:
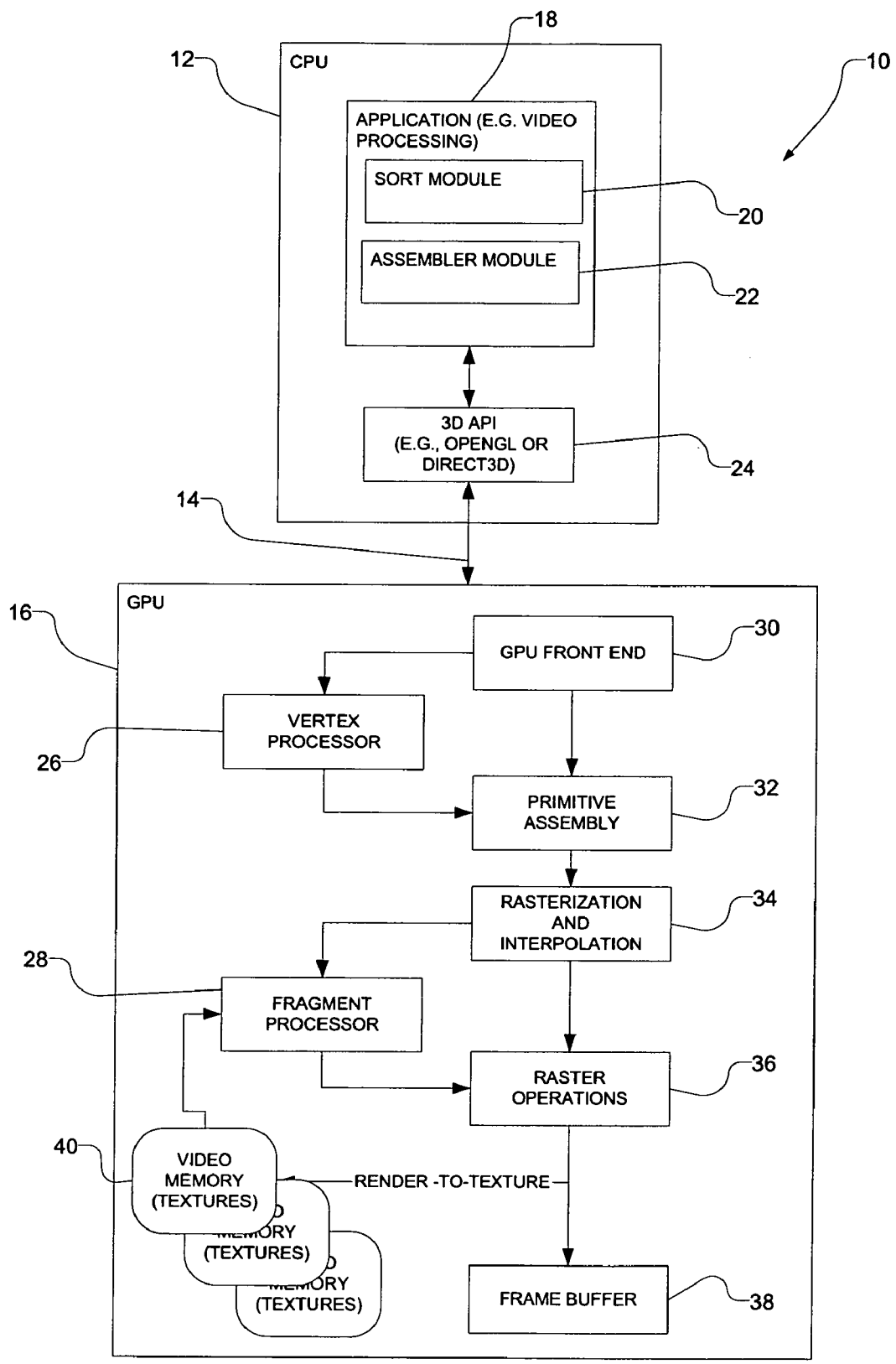
FIG. 1 is a block diagram illustrating a system, according to an example embodiment of the present invention, which may be a personal computer system (PC).

Methods, apparatus and systems for GPU-assisted 3D compositing are described herein. In the following description, numerous specific details are set forth. However, it is understood that embodiments of the invention may be practiced without these specific details. In other instances, well-known structures and techniques have not been shown in detail in order not to obscure the understanding of this description. Additionally, in this description, the phrase "example embodiment" means that the embodiment being referred to serves as an example or illustration.

In one example embodiment, a technique is described that utilizes a combination of Central Processing Unit (CPU) and Graphics Processing Unit (GPU) processing to accelerate the compositing of three-dimensional images (e.g., scene images). In this embodiment, the preparation of image elements, in the example form of image layers, for GPU processing is handled by the CPU. The rendering of each image layer is then performed by the GPU. The example technique enables the GPU to render each image layer in a single pass through the respective layer, thus avoiding the performance penalties of multi-pass techniques. However, the present invention is of course not limited to single pass processing by the GPU.

In the example embodiment, the disclosed technique identifies image elements (e.g., layers) within, or that are to form part of, a three-dimensional image (e.g., three-dimensional scene). The technique splits at least a subset of these layers into image pieces, and then sorts these image pieces on the CPU. Optionally, shadow maps for the image pieces may also be constructed. For each image layer, the technique further, on the CPU, assembles a GPU program, in the example form of a shader, which computes one or more effects with respect to the associated image layer. Such effects may include, for example, motion blur, trackmatte, or lighting effects. The same GPU program may also implement an appropriate blending (or compositing) mode by operationally blending a resultant color with a background color according to a specified blending (or compositing) mode. The GPU program for each image layer is accordingly executed by the GPU to apply one or more effects, (e.g., motion blur, trackmatte, lighting, etc), applicable to a respective image layer, and to composite the relevant image of layer, in a single pass over the image layer. In this case, the number of texture processing units of the GPU used is 2 plus (number of effects).

For the purposes of the present specification, the term "image element" shall be taken to include, but not be limited to, image layers, image pieces, and image fragments that may be identified and/or generated by image processing software, firmware or hardware. In one example embodiment, an image element may comprise a convex polygon, which is described by a series of vertices. Accordingly, image elements may be defined by a series of vertices, which are processed by the CPU and/or the GPU.

FIG. 1 is a block diagram illustrating a system 10 (e.g., a personal computer system (PC)), within which an example embodiment of the present invention may be implemented and/or executed. The system 10 includes a central processing unit (CPU) 12, which is coupled via an interconnect 14 (e.g., a bus) to a graphics processing unit (GPU) 16. While the CPU 12 and the GPU 16 may be embodied by separated and distinct integrated circuits, the units 12 and 16 may in one embodiment be formed on a single chip die, or in fact be implemented as a unitary integrated circuit. Accordingly, for the purposes of the present application, the terms CPU and GPU may be taken to refer to distinct processing domains, but not necessarily to distinct integrated circuits or components.

While the architecture of the CPU 12 is not explicitly illustrated, the CPU 12 is shown to execute a graphics processing application 18 (e.g., a video compositing or motion graphics application) that includes a sort module 20 and an assembler module 22. At a high level, in one example embodiment, the sort module 20 operates to split and sort image elements of a three-dimensional image scene, and the assembler module 22 operates to dynamically assemble a GPU program for each such image element. Details regarding the operations performed by the sort module 20 and the assembler module 22 are provided below. The image processor application 18 is furthermore shown to communicate with the GPU 16 via a 3D Application Program Interface (API) 24 (e.g., the OpenGL or the Direct3D APIs).

FIG. 1 also illustrates the logical architecture of an example GPU 16. The example GPU 16 is a stream processor that operates as the core computational unit for a graphics card, and has its own memory for the storage of image data and programs. The example GPU 16 is designed to handle geometric data and includes two types of processors, namely a vertex processor 26 and a fragment processor 28. Dealing more specifically with a graphics processing pipeline that may be implemented by the GPU 16, a GPU frontend 30 operationally receives image data and programs from the image processing application 18 executed by the CPU 12. Specifically, the image processing application 18 may issue 3D API commands to the 3D API 24, which in turn issues GPU commands, and an associated data stream, to the GPU frontend 30. The GPU frontend 30 provides pre-transformed vertices to the vertex processor 26. The vertex processor 26 is programmable, and typically executes a GPU program, in the form of a vertex shader, to generate and output transformed vertices to a primitive assembly pipe stage 32. The GPU frontend 30 also provides a vertex index stream to the primitive assembly pipe stage 32.

Assembled parameters are then communicated from the primitive assembly pipe stage 32 to a rasterization and interpolation pipe stage 34, which is supported by a rasterizer (not shown). Pre-transformed fragments are then provided from the rasterization and interpolation pipe stage 34 to the fragment processor 28, which in turn executes a further GPU program, in the example form of a fragment shader. The fragment processor outputs transformed fragments to a raster operations pipe stage 36. The rasterization and interpolation pipe stage 34 also outputs a stream of pixel locations to the raster operations. The raster operations then provide pixel updates to a frame buffer 38. The pixel updates are also provided to video memory 40, via a "render-to-texture" operation. To this end, the video memory 40 may be constituted by a collection of texture processing units, which are then again readable by the fragment processor 28 for image compositing operations.

Figure 2:
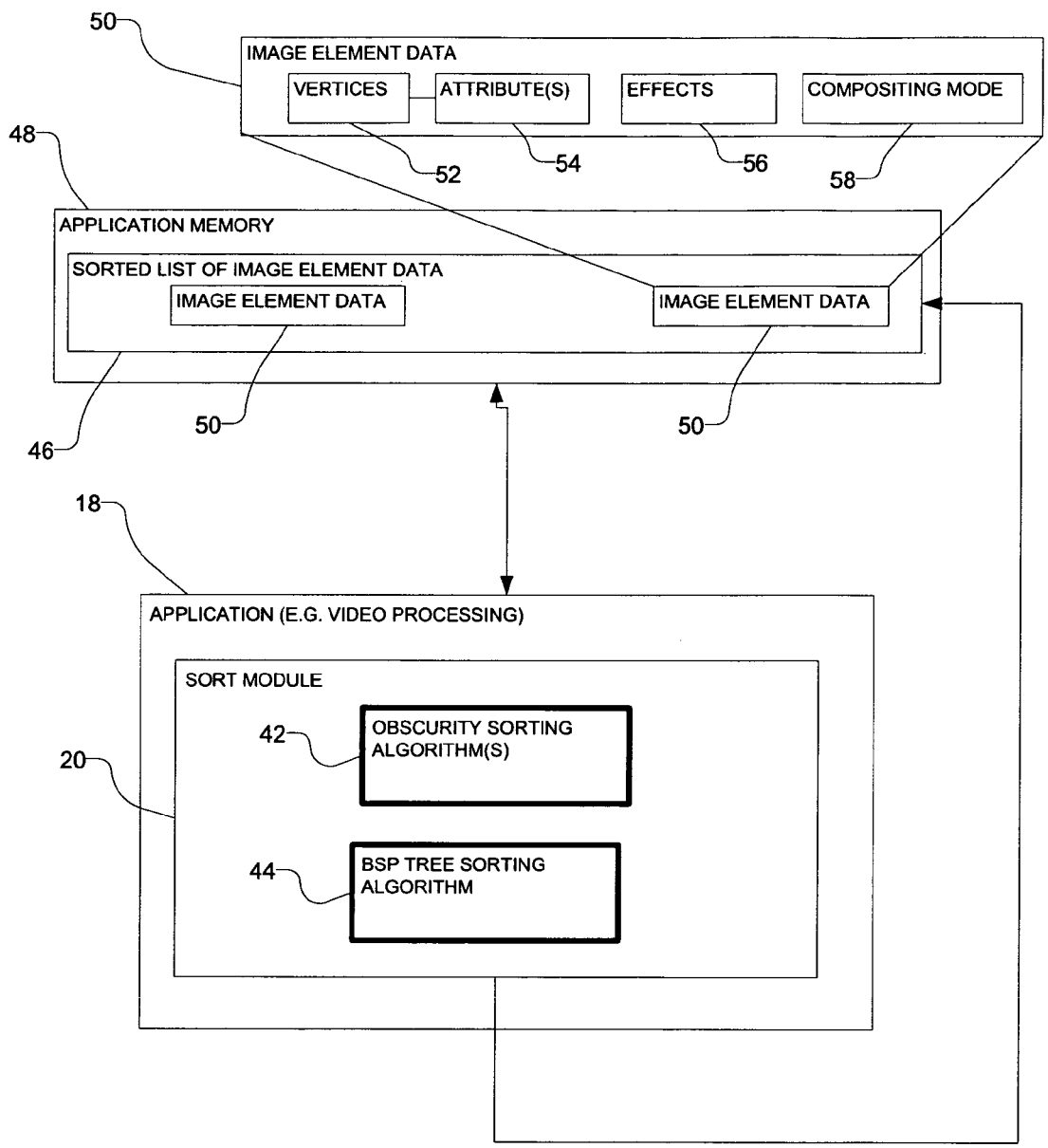
FIG. 2 is a block diagram illustrating further architectural details regarding an image processing application, and an associated application memory, as well as the architectural detail of certain data structures, according to one example embodiment of the present invention.

FIG. 2 is a block diagram illustrating further architectural details regarding the image processing application 18, and an associated application memory 48, as well as the architectural detail of certain data structures, according to one example embodiment of the present invention. The architectural details shown in FIG. 2 are pertinent to the splitting and sorting of image elements, as will be described in further detail below. The image processing application 18 is again shown to include the sort module 20, which in turn includes one or more depth sorting algorithms and/or obscurity sorting algorithms 42, and a Binary Space Partition (BSP) tree sorting algorithm 44. Operationally, the sort module 20 operates to generate a sorted list 46 of instances of image element data 50 (image elements), which is maintained within application memory 48. The sorted list 46 includes multiple instances of image element data 50, the instances of image element data 50 being sorted according to the order in which the image element data will be communicated to and processed by the GPU 16. Each instance of the image element data 50 is further shown to include one or more vertices 52 (e.g., defining a convex polygon) and associated attributes 54. The associated attributes may be effect specific. For example, motion blur, in an example embodiment, needs a two-dimensional vertex describing the apparent motion of each vertex over the time that the camera's shutter angle is open. This varies by vertex because perspective makes each vertex appear to move at a distinct rate. For trackmattes, each vertex needs a coordinate describing its location in the matte image. This coordinate may be the same as the coordinate of the vertex in the background image. Eye space position (a 3-vector) is another example of attribute information that may be associated with a vertex. This attribute information is needed for lighting equations. Other exemplary attributes may include depth of field (e.g., the z-coordinate of the eye space position), in accordance in light space for shadows (a 4-vector).

Each instance of image element data is furthermore shown to identify one or more effects (e.g., motion blur, trackmattes, lighting/shadowing, etc.) that are applicable to the image element data 50, and to identify a compositing mode applicable to a rendering of the relevant image element data 50.

Figure 3:
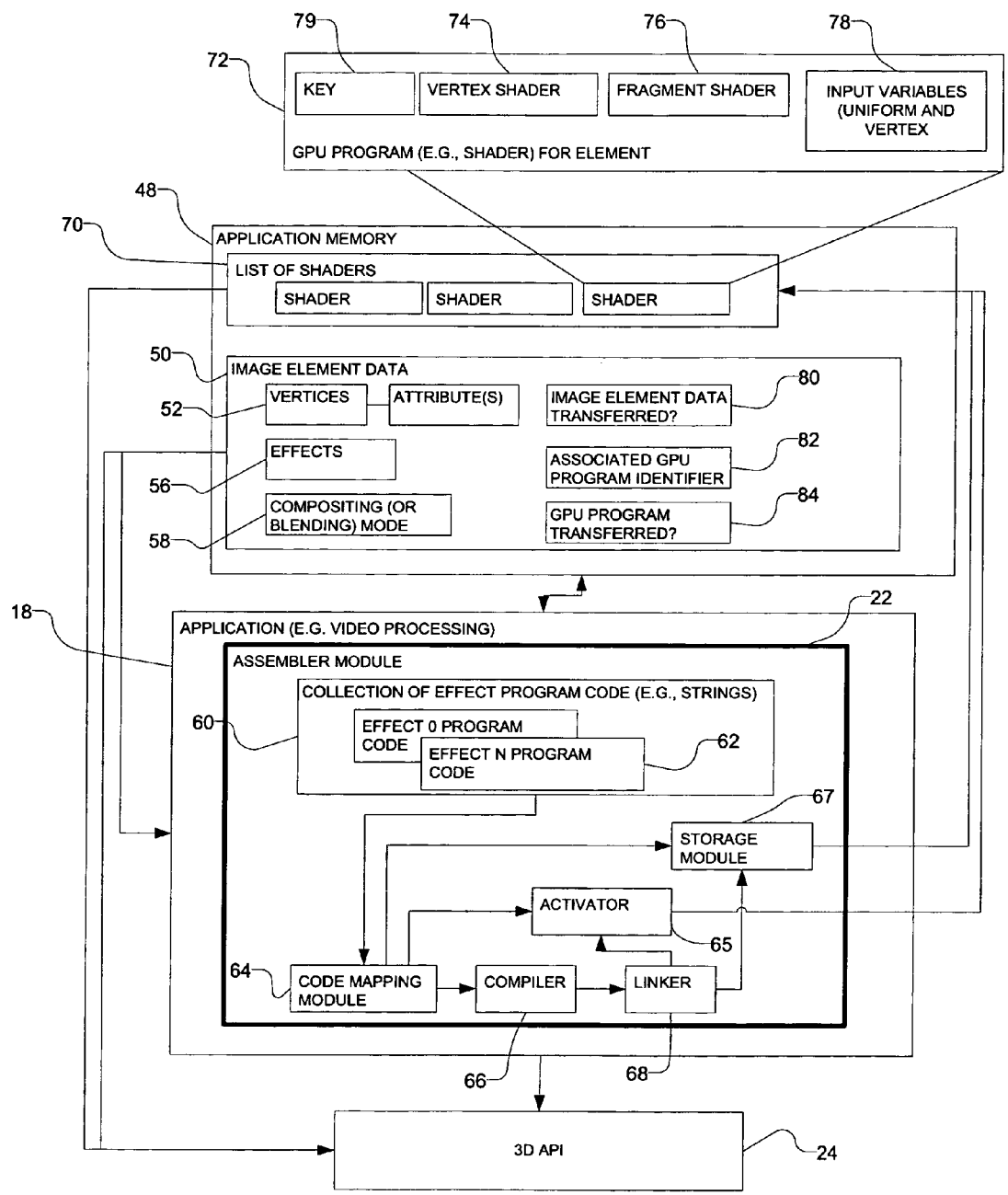
FIG. 3 is a block diagram illustrating further architectural details of an image editing application, and specifically the assembler module of such an application, and associated data structures, according to one example embodiment of the present invention.

FIG. 3 is a block diagram illustrating further architecture of an exemplary image processing application 18. FIG. 3 specifically illustrates the assembler module 22 of such an application 18, and associated data structures, according to one example embodiment of the present invention. The architecture described with reference to FIG. 3 is pertinent to a description of the dynamic assembly of a GPU program for an image element, which follows below.

The assembler module 22 of the image processing application 18 is shown to include a collection 60 of effect program codes 62. Each instance of effect program code 62, in one example embodiment, is a string representing various subroutines needed to render an image element in accordance with a particular effect. For example, a first instance of effect program code 62 may render a motion blur effect, while a second instance of effect program code 62 may render a lighting effect. At a high level, the assembler module 22 operates to concatenate strings representing the various subroutines into a composite string that may be compiled into a GPU program (e.g., a shader). To this end, the assembler module 22 is shown to include a code mapping module 64 that determines, for a particular image element, the ordering of effects, and accordingly the order of various instances of effect program code 62 that are concatenated for compilation into a shader.

The code mapping module 64 is furthermore responsible for the generation and maintenance of a key 79 for each GPU program that is compiled. Accordingly, the code mapping module operates to map keys 79 to compiled GPU programs. Further details regarding the structure and generation of a key 79 are provided below. The code mapping module 64 is also coupled to an activator 65. In the event that the code mapping module 64 determines (using a key 79) that an appropriate GPU program has already been compiled and stored on the GPU, the code mapping module 64, via the activator 65, causes the stored GPU program to be activated. To this end, in one embodiment, the code mapping module 64 maintains a repository of keys 79 for GPU programs that are stored in the application memory and/or that have been loaded to the GPU.

On the other hand, should a suitable GPU program 72 not already have been compiled and stored for a particular instance of image element data 50, the code mapping module 64 transfers an ordered list of strings to a compiler 66 and a linker 68 that operate to compile and link the strings. The appropriate vertex and uniform variables are assigned after the GPU program 72 is activated. A compiled shader is then stored, utilizing a storage module 67, in a list 70 of GPU programs 72. Each GPU programs 72 in the list 70 constitutes an example of a dynamically generated and compiled GPU program 72 that is associated with a one of more instances of image element data 50. As mentioned elsewhere, a GPU program 72 suitable for rendering a particular instance of image element data 50 may also be suitable for rendering another instance of image element data 50, but possibly with different variables. Accordingly, the GPU program to image element data assignment may not necessarily be a unique, or one-to-one, assignment.

Each example GPU program 72 is further shown to include at least one of a vertex shader 74 for programming of the vertex processor 26 of the GPU 16, a fragment shader 76 for programming of the fragment processor 28 of the GPU 16, and multiple input variables (e.g., uniform and vertex variables) with which the CPU 12 programs the GPU 16.

FIG. 3 also illustrates that an instance of image element data 50, and an associated GPU program 72 (e.g., shader) are communicated from the application memory 48, via the 3D API 24, to the GPU 16. To this end, in one embodiment, the image element data 50 may include an indicator 80 of whether a particular instance of image element data 50 has been transferred to the GPU 16, an associated GPU program identifier 82 to enable an association of a particular instance of image element data 50 with a particular GPU program 72, and an indicator 84 of whether the associated GPU program 72 has been transferred to the GPU 16. The indicators 80 and 84 may be utilized by the application 18 to determine whether a particular instance of image element data 50, or an associated GPU program 72, have previously been transferred and are stored within the GPU 16.

In another embodiment, the data structures 80-84 may not be necessary because of the key 79. Also consider that multiple image elements in a particular three-dimensional scene may each have the same set of attributes making up a relevant key 79. In this case, the GPU program 72 would be the same for each image element, but the image element itself would of course be different. While the same GPU program 72 may be applicable and utilized to render each of these image elements, some of the vertex or uniform variables for the GPU program 72 would however be specific to a image element (e.g., position).

Figure 4:
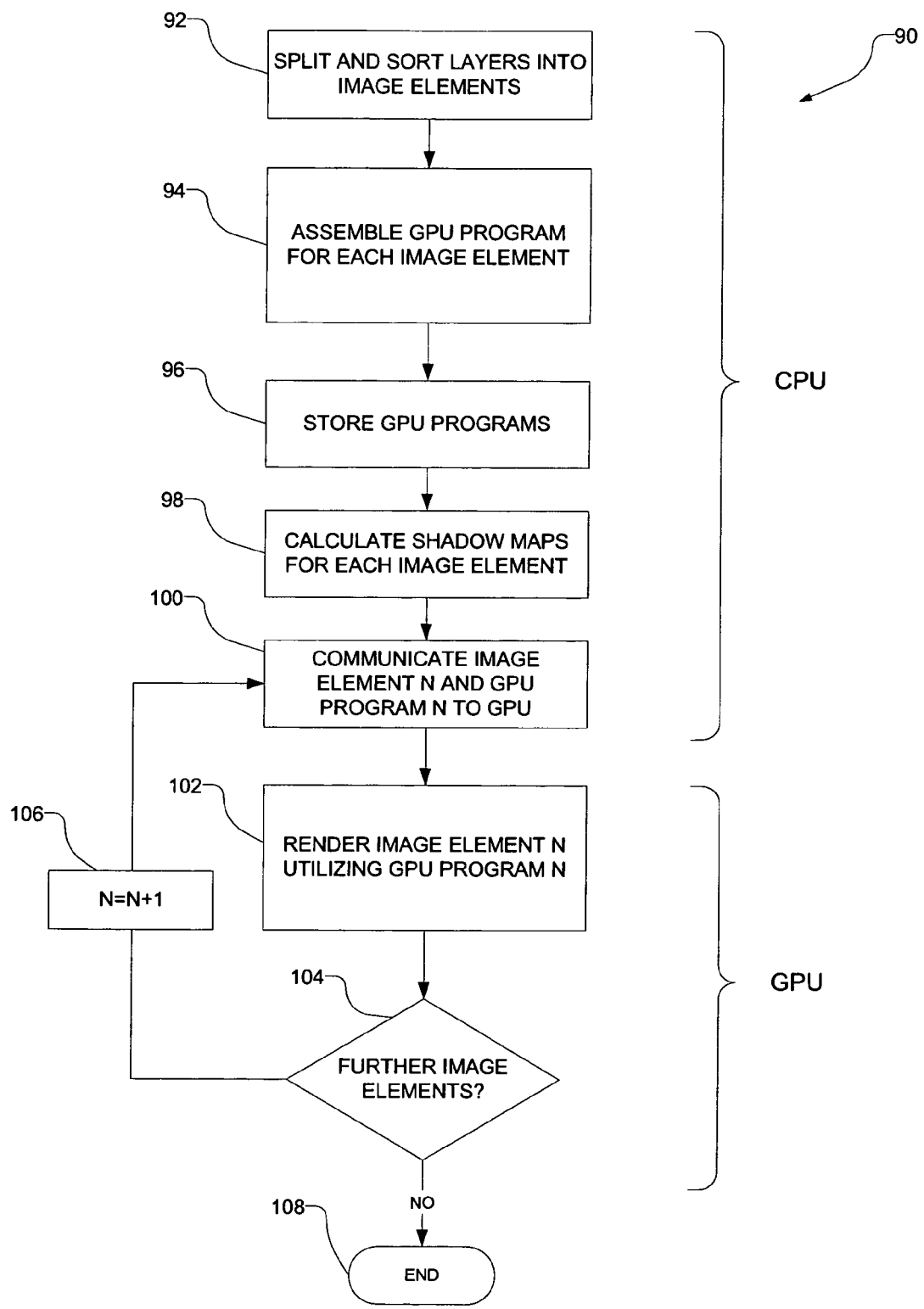
FIG. 4 is a flowchart illustrating a method, according to an example embodiment of the present invention, to perform GPU-assisted compositing of a three-dimensional image (e.g. scene).

FIG. 4 is a flowchart illustrating a method 90, according to an example embodiment of the present invention, to perform GPU-assisted compositing of a three-dimensional image (e.g., a scene). The illustrated flowchart distinguishes between operations performed on the CPU 12 and the GPU 16. Further details regarding the various operations described with reference to FIG. 4 are provided subsequent to the discussion of FIG. 4.

The method 90 commences with the receipt of a three-dimensional digital image into application memory, and the identification of image elements (e.g., layers) within that digital image. In one example embodiment, image elements may be identified by a user for inclusion within a composite image that the user is constructing utilizing the image processing application 18. One example of such an image processing application 18 is the After Effects 6.0 application, developed by Adobe Systems Incorporated, of San Jose, Calif.

At block 92, the sort module 20 of the image processing application 18 splits and sorts image elements (e.g., image layers) into a further, expanded set of image elements that is sorted into an order to be rendered for display on a display device associated with a computer system.

At block 94, the imaging processing application 18, and specifically the assembler module 22, assembles a GPU program 72 (e.g., a shader) for each image element identified and/or generated at block 92. At block 96, the assembled GPU program 72 is stored, as described above with reference to FIG. 3, in a list 70 at block 98. The image processing application 18 may optionally calculate shadow maps for each of the image elements identified and/or generated at block 92. The method 90 then proceeds to block 100, where instances of image element data 50, and associated GPU programs 72, are transferred from the application memory 48, by the 3D API 24, to the GPU 16. In a variation on the method 90, in the event that a suitable GPU program is identified as already having been generated and stored, the application 18 may simply initiated the relevant GPU program 72 following the identification thereof as being suitable for rendering a particular image element.

The operations performed at blocks 92-100 are, as illustrated in FIG. 4, all performed on the CPU 12 (or within the CPU domain or utilizing CPU processing). Further, it should be noted that the communication of instances of image element data 50, and associated GPU programs 72, to the GPU 16 need not occur in the sequence illustrated in the flowchart of FIG. 4. For example, the sorting operation with respect to image elements need not complete prior to the dynamic assembly of a GPU program 72. For example, if the sort order with respect to a specific instance of image element data 50 is finalized, the GPU program 72 for the relevant instance of image element data 50 may be assembled (or initiated) at that point, and the relevant image element data 50 and associated GPU program 72 may be communicated, while sorting continues with respect to other instances of image element data 50.

Returning to the method 90, at block 102, the relevant GPU program 72 is received at the GPU, along with appropriate uniform and vertex variables. The GPU 16 is then programmed in accordance with the received GPU program 72 and uniform and vertex variables. The associated instance of image element data 50 is then received, this data then being rendered by the appropriately programmed GPU 16.

At decision block 104, a determination is made whether any further instances of image element data 50 require processing. For example, the CPU 12 may have indicated that further instances of image element data 50 are awaiting processing. If so, the method 90 loops back, via block 106, to block 100. Alternatively, should no further instances of image element data 50 require processing, the method 90 terminates at termination block 108.

Further details regarding a number of the operations described above with reference to FIG. 4 will now be provided.

Figure 5:
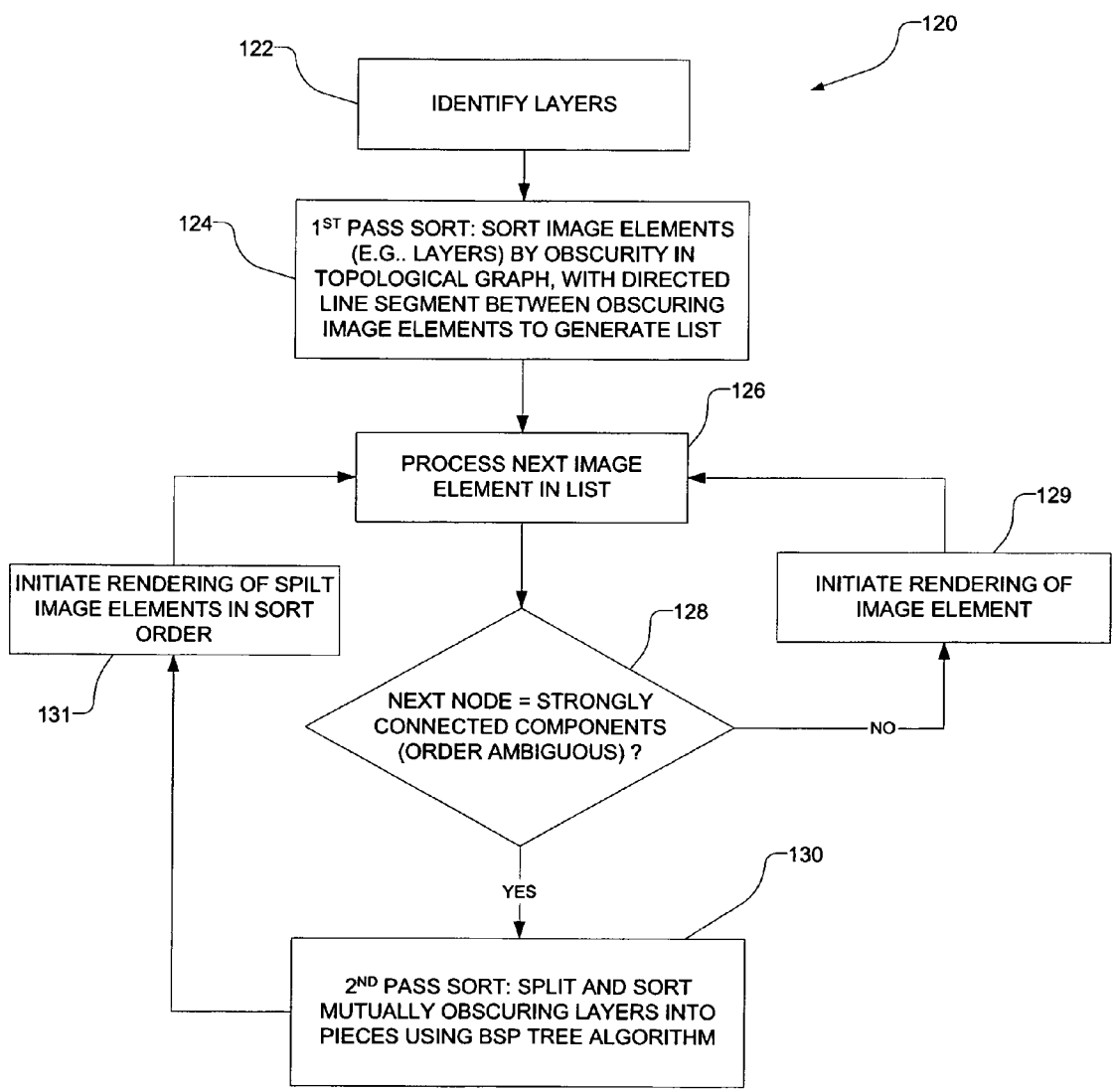
FIG. 5 is a flowchart depicting a method, according to one example embodiment of a present invention, to sort image elements (e.g., including image layers) on a CPU for eventual compositing and rendering on an associated GPU.

FIG. 5 is a flowchart depicting a method 120, according to one example embodiment of a present invention, to sort image elements (e.g., including image layers) on a CPU 12 for eventual compositing and rendering on an associated GPU 16. Accordingly, the method 120, in one example embodiment, seeks to sort the image elements so as to provide a visibility ordering to such image elements and thereby to ensure that a correct picture results if the image elements are rendered in that order.

At a high level, the method 120 proposes processing a digital image data to identify a number of image elements (e.g., layers) to be included therein. For example, the image elements may be image elements that have been newly identified by a user of the image processing application 18. The identified image elements may also include image elements that the user has previously identify for inclusion within a composite digital image, and that have already been rendered as part of such a composite digital image. The newly-identified and previously-identified image elements will accordingly need to be rendered in a proper composite order, and taking into account the effects that may have been specified by a user, as well as a compositing modes that may been specified by a user for the various digital elements.

A first sort operation is then performed with respect to the identified image elements, based on obscurity among the identified image elements. A sort operation based on obscurity may be utilized to generate a "partially ordered set" or a "partially ordered list," in which the relative order of non-obscuring image elements is not crucial to further processing of a set of image elements. In an alternative embodiment, the first sort operation may be based on some other list priority algorithm that determines a visibility ordering of image elements. In such an embodiment, a "totally ordered set" may be generated, in which the obscuring and non-obscuring image elements of the set are provided with a relative ordering. For example, in such an alternative embodiment, the first sort operation may utilize a depth-sort algorithm which assumes that relative depth information regarding image elements according to visibility. However, the example embodiment described below, in which sorting is based on obscurity, only requires that relative obscurity information is known or determinable.

A second sort operation is then performed with respect to the image elements, utilizing a Binary Space-Partitioning (BSP) tree algorithm. The first sort operation may include identifying non-obscuring, obscuring and mutually-obscuring image elements. The identification of the mutually-obscuring image elements may include clustering or grouping of image elements (e.g., by treating such a cluster of mutually-obscuring image elements as a single node in a topological graph) for which there is ambiguity regarding the relative ordering. This grouping or clustering of image elements is performed with a view to performing the second sort operation utilizing the BSP tree algorithm. In one embodiment, the image elements (including a clustering of mutually-obscuring image elements) may be represented by nodes in a topological graph (or alternatively by entries in a partially sorted list), as will be described in further detailed below. For example, a cluster of mutually-obscuring image elements may be represented, prior to the application of a BSP tree algorithm, as a single node within the topological graph. The clustering of image elements may then be subject to a split and sort operation that is performed utilizing the BSP tree algorithm.

Returning to the method 120, which we described with reference to FIG. 5, an example embodiment of the present invention will now be described in which the image elements comprise image layers. Further, in this example embodiment, image layers are considered to be flat textured rectangles positioned in three-dimensional space by an affine transformation. Non-intersecting image layers may be sorted by methodologies and techniques in which the notion of obscurity plays a role. For example, consider that Layer A may obscure Layer B, if part of Layer A lies in front of Layer B, when viewed from a specific point in space (viewing point). Non-intersecting layers can be given a partial sorting order by providing Layer A with a greater ranking than Layer B, if Layer A obscures Layer B. Further, consider that problems may arise even if there are no intersecting layers. For instance, image layers can form a cycle where Layer A obscures Layer B, which obscures Layer C, which in turn obscures Layer A. In the case of intersecting layer images, portions of each layer image may obscure portions of other layer images.

The method 120 is described with reference to a simplified example of a three-dimensional image layer arrangement. In the example, various image layers, for the sake of simplicity, are assumed to extend parallel to the xy-plane. However, it will be appreciated that these image layers could be inclined with respect to the xy-plane, which would introduce further considerations into the handling of these image layers.

The method 120 commences at block 122, with the processing of a digital image (or input for the creation of a digital image) to identify one or more image elements, in the example form of image layers, to be rendered as part of a three-dimensional, composite image. These image layers may be identified and/or defined by a user of the image processing application 18 for inclusion within a three-dimensional digital image, merely for example. Alternatively, the image layers to be included within the composite three-dimensional image may be identified by an automated process, such as by other software.

Figure 6:
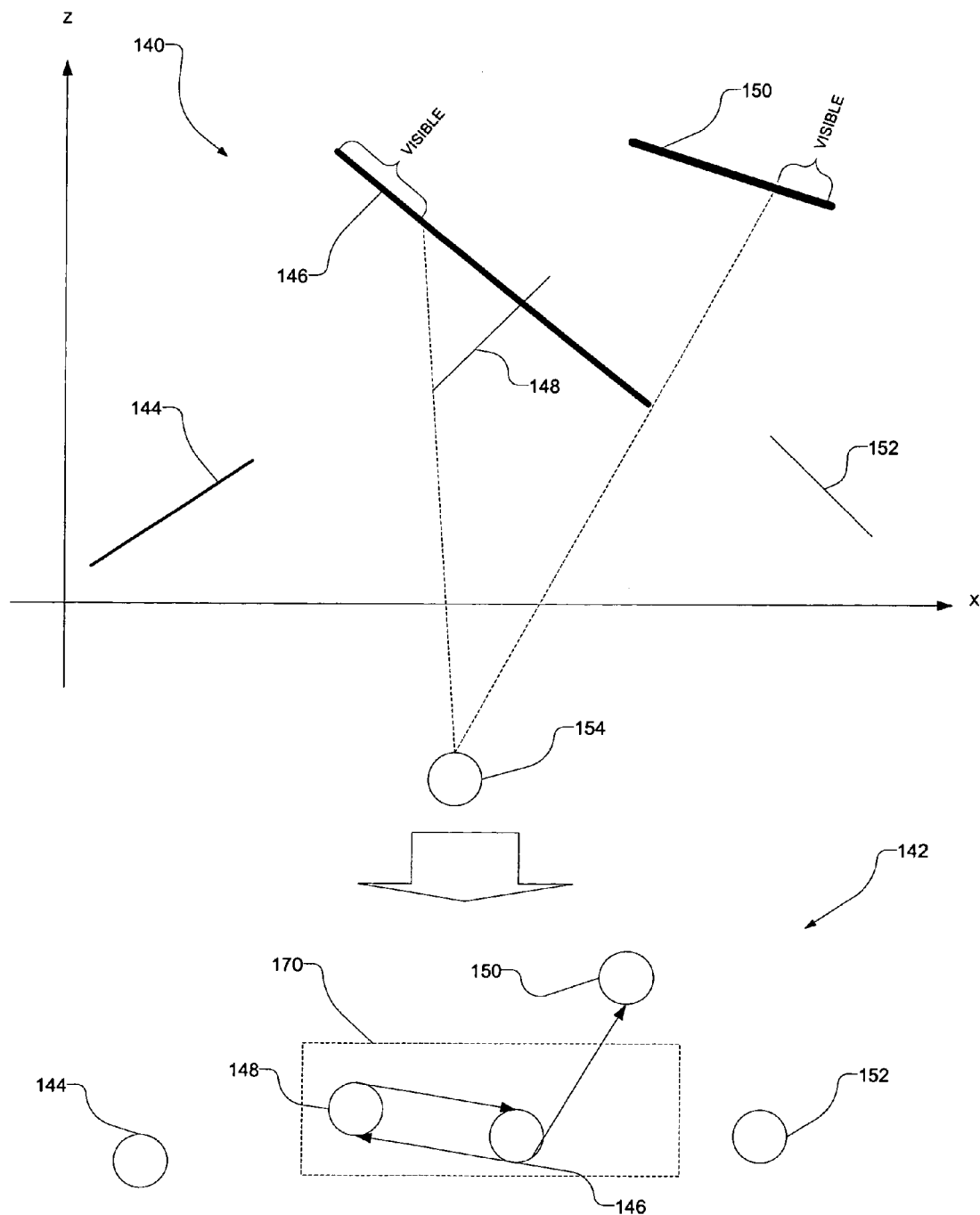
FIG. 6 illustrates an example arrangement of image layers within a three-dimensional environment.

FIG. 6 illustrates an example arrangement 140 of image layers within a three-dimensional environment. The view provided in FIG. 6 is from the vantage point of the y-axis, and accordingly shows the x-axis and the z-axis, and further displays the relative locations of image layers 144, 146, 148, 150 and 152. Further, FIG. 6 illustrates a viewing point 154, this being a point in space from which a view of the various image layers 144-152 will be rendered. Accordingly, at block 122, the sort module 20 of the image processing application 18 may identify the various image layers 144-152.

At block 124, having identified the various image layers, a first sort operation is performed to sort the image layers 144-152 (or groupings or clustering of layers) by obscurity within a topological graph. Within the topological graph, image layers may be represented by nodes (e.g., representative of a vertex of the image layer closest to the viewing point 154). For this first sort operation, image layers for which there exists ambiguity regarding a sort order (e.g., mutually-obscuring image layers) may be the grouped or clustered, and initially represented by a single node within the topological graph.

Within the topological graph, directed line segments (or other directional indications) identify obscurity relationships between the represented image layers. Consider for example that a directed line segment would extend from Layer A to Layer B, if Layer A obscures Layer B. This direct line segment may also be bidirectional if Layer B also obscures Layer A.

Referring again to FIG. 6, an example topological graph 142 is shown as having been generated from the arrangement 140 of image layers 144-152. As illustrated, each of the image layers 144-152 is represented by a corresponding node. It will be noted that certain nodes (e.g., nodes 144 and 152) constitute singleton nodes as the corresponding image layers do not obscure, and are not obscured by, other image layers within the arrangement 140. However, other nodes within the topological graph 142 (e.g., nodes 146, 148 and 150) are shown to be connected in view of obscurity relationships between the corresponding image layers. Further, the nodes are connected by directed line segments (representative of data indicating an obscurity relationship) that provide information regarding the obscurity relationship between the corresponding image layers from the viewing point 154. The cluster or group of nodes 146 and 148 accordingly comprise a group 170 of strongly-connected nodes (or image elements), on account of the image elements being mutually obscuring. It will be appreciated that, within the group 170 of strongly-connected nodes (or image elements), some ambiguity regarding ordering exists. The method 120 seeks to resolve that ordering ambiguity.

At block 124, the sort module 20, and specifically the obscurity sorting algorithm 42, includes strongly-connected nodes within the topological graph 142 as a single node representation (e.g., a node representing the group 170). One example of a methodology that may be utilized to identify strongly-connected nodes (representative of obscurity image elements) can be found in the reference G. Chartrand, O. Oellermann, "Applied and Algorithmic Graph Theory," Chapter 11, McGraw-Hill. Further, a technique for determining when one image layer obscures another can, in one example embodiment, be implemented utilizing a series of tests listed in the reference Foley and Van Dam, "Computer Graphics: Principles and Practice", Second Edition, pages 672-680, Addison-Wesley, 1990. These series of tests are designed to test trivial cases first. The last test (if all others yield inconclusive results) is to project the layers onto a view plane, clip one layer against another, and cast a ray through the intersection. If the intersection is empty, the image layers do not obscure each other. If there are obscuring image layers, the image layer which is closest to the ray origin obscures the other layers.

As mentioned above, at block 124, the sort module 20 locates strongly-connected components (or image layers). Such strongly-connected image layers, in one example embodiment, may be identified as image layers that are mutually-obscuring, either as a result of an intersection between the relevant layers or because the relevant image layers form a cycle. Following identification of these strongly-connected components (or image layers) at block 126, for which the rendering order is ambiguous, the ordering of these layers remains to be determined. However, for the purposes of the first sort operation formed at block 124, strongly-connected components are regarded as a single node.

Following the completion of the first sort operation at block 124, the application 18, and specifically the assembler module 22, begins to process instances of image element date 50 according to the sort order represented in the topological graph. At decision block 128, a determination is made whether a next node to be processed in the topological graph represents a group of strongly connected components. If not, at block 129, the rendering of an instance of image element data 50 associated with the node is initiated. On the other hand, should the next image to be processed represent a group of strongly connected components, the method proceeds to block 130.

At block 130, the relevant strongly-connected components (e.g., image layers) are split into pieces (e.g., a further set of image elements or image layers) and are sorted. This splitting and sorting may be achieved utilizing a Binary Space-Partitioning (BSP) tree algorithm, such as that developed by Fuch, Kedem, and Naylor. More specifically, at block 130, the mutually-obscuring layers are split into pieces utilizing the BSP tree algorithm. For example, it should be noted that each image layer has a front and a back side. An image layer is picked to be the root of the BSP tree. The other image layers in the strong components are classified as either in front of, behind or coincident with or spanning the root plane containing the root image layer. Those that are coincident with the root image layer cannot obscure and are furthermore not obscured by the root image layer. These coincident image layers are placed in a root list, and can be rendered in any order during compositing. Those that are entirely behind or entirely in front of the root plane are placed in lists in the nodes called "front" and "behind".

Those image layers that intersect with the root plane are split along the line of intersection, producing image elements (e.g., pieces) that lie entirely on one side of the root plane or the other. These pieces are then placed in the appropriate "front" or "behind" lists. The process is called recursively on the front and back nodes.

While having split the mutually obscuring image layers in the manner described above, the image elements in the resultant BSP tree can be sorted by a "depth first" search, traversing nodes back, route and then front.

Having split and sorted, the mutually obscuring layers at block 130, the method 120 then proceeds to initiate rendering of the split image elements generated at block 130, in the order determined by the BSP tree algorithm. The method 120 terminates when there are no further image elements to be processed at block 126.

A complete sort of image layers need not be completed at block 124 before the other operations of method 120 are initiated or even completed. For example, consider the example in which a first pass sort of image layers (by obscurity) commences at block 124, and a singleton node is located within the topological graph, prior to encountering any strongly-connected components. In this case, where there is no ambiguity regarding the rendering order of the particular image layer associated with a node, downstream processing of the relevant image element may be initiated. The sorting and identification of such "singleton nodes" within the topological graph 142 may continue until a clustering or group 170 of strongly-connected image elements is encountered. The second sort operation (e.g., as performed at block 130) may then be invoked to resolve the order ambiguity that exists within the group 170 of strongly-connected elements.

One advantage of using the two-part sorting approach described above with reference to FIG. 5 is efficiency. For example, were the BSP tree algorithm to be deployed without first attempting the first sort operation described at block 124, certain non-obscuring image layers may needlessly be split (e.g., those image layers that do not obscure another image layer, but nonetheless cross the plane of an image layer identified as the root plane of the BSP tree). Accordingly, the method 120 may result in less image elements being generated by the splitting operation of the BSP tree sorting algorithm than would have resulted if the BSP tree sorting algorithm were to be deployed alone, or ahead of another sorting methodology. A copy of a portion of the frame buffer 38 of the GPU 16 is made for each image element (e.g., each image layer) drawn. Accordingly, there is a performance advantage to having the GPU 16 process less image elements.

Figure 7:
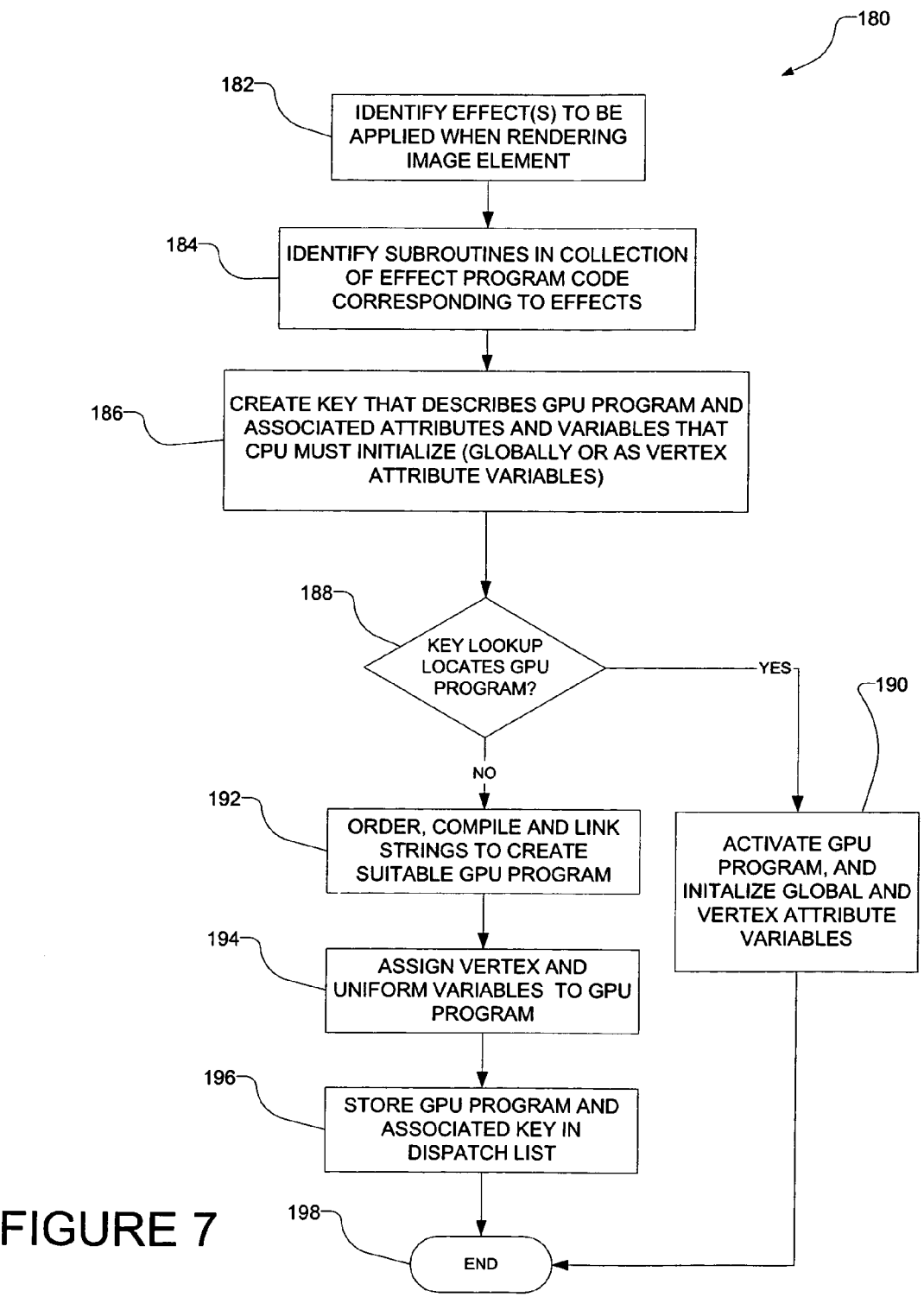
FIG. 7 is a flowchart illustrating a method, according to an example embodiment of the present invention, to dynamically assemble a GPU program, on a central processing unit (CPU) for each of a number of image elements (e.g., image layers).

FIG. 7 is a flowchart illustrating a method 180, according to an example embodiment of the present invention, to dynamically assemble a GPU program, on a central processing unit (CPU), for each of a number of image elements (e.g., image layers). A GPU program (e.g., a shader) is generated for each of the respective image elements, and operatively applies one or more effects to a rendering of the respective image element, and also operates to composite the respective image element according to a compositing mode specific to the respective image element.

As noted above, the GPU 16 is programmable (e.g., by vertex and fragment shaders) to apply various image modification (or processing) effects during rendering of an image. Such effects may include, merely for example, motion blur, trackmattes, and lighting/shadowing effects. Any number of effects may be applicable to the rendering of a specific image element. For this reason, it is somewhat impractical manually to write a GPU program for each possible permutation and combination of effects ahead of time. It is furthermore less than desirable to utilize condition statements within a GPU program (e.g., a shader), because the presence of multiple conditional statements would negatively impact GPU stream processing. Such conditional statements would also significantly increase the number of instructions within the GPU program. As instruction memory is a limited resource on a GPU, the presence of multiple conditional statements would also present challenges.

In one embodiment, the method 180 accordingly seeks to dynamically assemble a GPU program, utilizing the assembler module 22 on the CPU 12. A GPU program may be dynamically assembled as needed when rendering an image element (e.g., an image layer or a piece of an image layer).

The method 180 commences at block 182, with the identification by the assembler module 22 of one or more effects to be applied when rendering an image element. This determination may be made, for example, by accessing an appropriate instance of image element data 50 to determine which effects 56 are specified to be applied to the relevant image element.

At block 184, the assembler module 22 identifies one or more instances of effect program code 62, in the exemplary form of strings representing various subroutines, needed to render the particular image element. For example, one such string may embody subroutines necessary to render a "motion blur" effect, whereas another string may embody subroutines necessary to render "trackmattes".

At block 186, having identified the appropriate instances of effect program code 62 from the collection 60, the assembler module 22, and more specifically the mapping module 64, proceeds to generate a key that describes the GPU program to be in generated, and that also describes the associated attributes and variables that the CPU must initialize (e.g., globally or as vertex attribute variables).

At decision block 188, the code mapping module 64 performs a key look up, utilizing the key generated at block 186, to determine whether a suitable GPU program to render the effects and compositing specific to the image element has already been compiled, stored and/or loaded. For example, this determination may be made by examining the keys 79 of the GPU programs stored within the list 70.

In the event that an appropriate GPU is located at decision block 188, the method 180 proceeds to block 190, where the assembler module 22, via the activator 65, proceeds to activate the identified GPU program, and also to initialize the appropriate global and vertex attribute variables.

On the other hand, should the key look up operation performed at decision block 188 fail to locate a compiled and stored GPU program, at block 192, the code mapping module 64 proceeds to order the appropriate effect program code (e.g. strings). For example, it may be desirable for certain effects to be performed ahead of other effects because certain information may be lost or modified during the application of an effect that is required for the application of a subsequent effect. Following such an ordering operation, the instances of the effect program code 62 are compiled and linked by the compiler 66 and linker 68. Thereafter, at block 192, the appropriate vertex and uniform variables are assigned to the GPU program 72.

Examples of a vertex shader and a fragment shader which may be generated as part of the GPU program are provided below.

An example program for a vertex shader may assume the following form:

void main(void)
{
   V_MotionBlur( );
   V_Texture( );
   V_Blend( );
   V_Trackmatte( );
   V_Position( );
}

The above vertex functions set varying variables for a fragment shader. V_MotionBlur, V_Texture and V_Blend routines set texture coordinates, and V_Position sets the required vertex position.

An example fragment shader main routine may have the following form:

uniform int num_lights;

void main(void)
{
   vec4 color;
   int i;
   F_MotionSample(color);
   F_Trackmatte(color);
   for(i=0; i<num_lights; i++) {
   F_Light(i, color);
   F_Blend(color);
   gl_FragColor=color;
}

The z-value is computed automatically by the GPU 16 and need not be supplied. The above algorithm is designed to work without needing hidden surfaces, as the image layers are rendered in the back to front order. The routines called by the fragment's main program take color as an inout parameter. The names of the subroutines are, in one example embodiment, the same, and only the body of the function changes. For instance, F_MotionSampler will either use an offset vector or not, depending on which string was loaded for the function body. The F_Light function can have a null body in which case there is no light shading for the ith light. The body of this function also varies depending on the light type and whether it casts a shadow. Various parameters for the light such as cone angle, or feathering are passed through uniform variables.

To avoid name collision, non-standard uniform variables are tagged with a meta-character. During assembly the meta-characters are replaced by the index of the light, forming a unique name.

At block 196, the assembly module 22, and more specifically the storage module of the 67, stores the GPU program 72, and the associated key 79, in the list 70 of the GPU programs 72 to be dispatched to the GPU 16 via the 3D API 24.

The method 180 then terminates at block 198.

Figure 8:
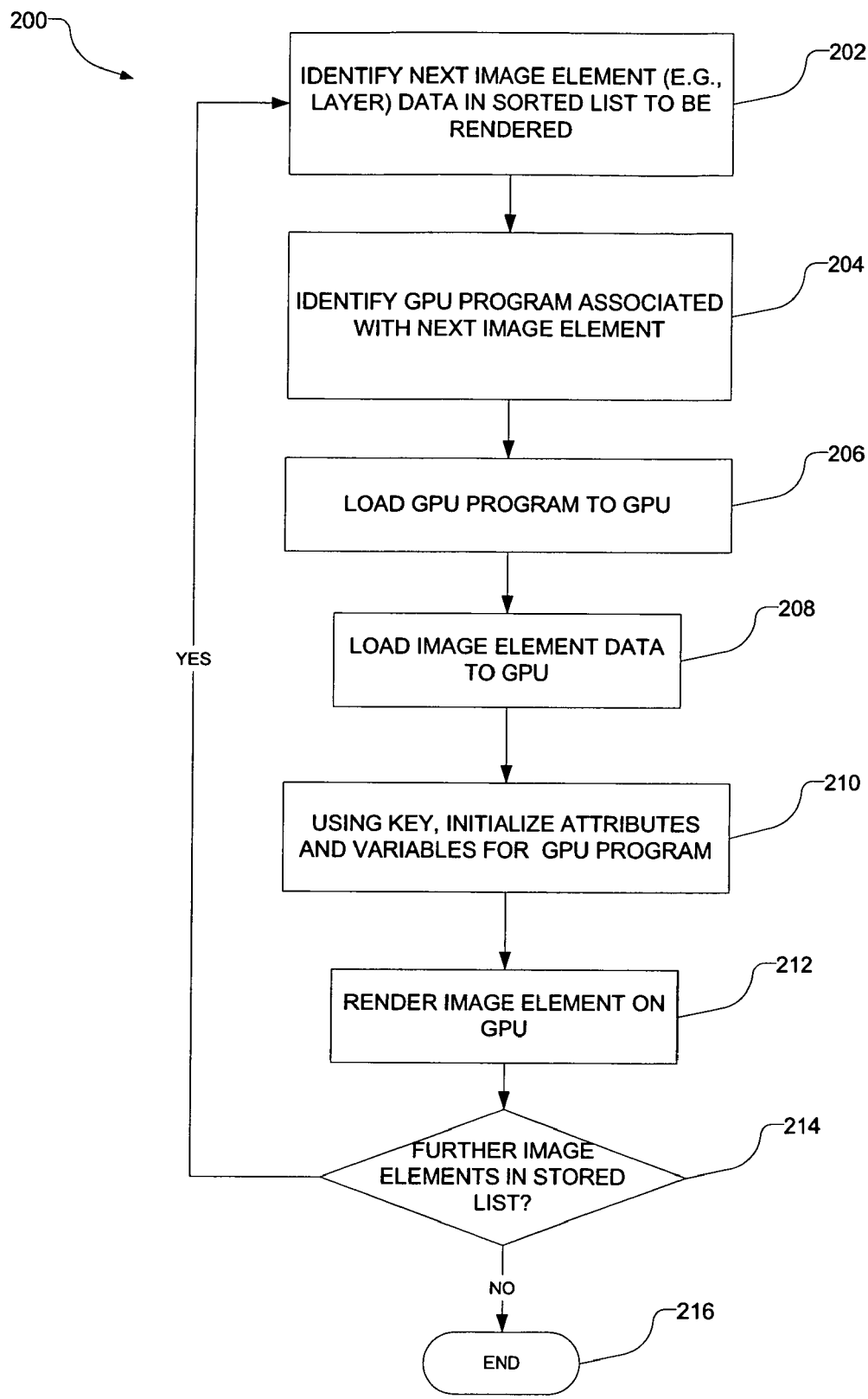
FIG. 8 is a flowchart illustrating a method, according to an example embodiment of the present invention, for the communication of a number of image elements, and associated GPU programs, from the CPU to the GPU, for storing the GPU program on the GPU, and also for the composite rendering of an image by the GPU utilizing the respective GPU programs.

FIG. 8 is a flowchart illustrating a method 200, according to an example embodiment of the present invention, for the communication of a number of image elements, and associated GPU programs, from the CPU 12 to the GPU 16, and also for the composite rendering of an image by the GPU 16 utilizing the respective GPU programs.

The method 200 commences at block 202 with the identification by the image processing application 18 (e.g., by a dispatch or interface module) of a next instance of image element data 50 within the sorted list 46 to be rendered.

At block 204, the application 18 identifies the GPU program 72 (e.g., shader) associated with the instance of image element data 50 identified at block 202. This identification may, for example, be performed utilizing the associated GPU program identifier 82, which is described as being stored as part of the instance of the image element data 50 in FIG. 3. In other embodiment, the association between a particular instance of image element data 50 and a GPU program 72 may be recorded in other ways.

At block 206, the associated GPU program 72 is loaded from the CPU 12 to the GPU 16, via the 3D API 24. Alternatively, the required GPU program 72 may already have been loaded (e.g., after having been compiled and linked), but not yet activated. In this case, at block 210, the required GPU program 72 may be activated by the activator 65 of the assembler module 22.

At block 208, the instance of the image element data 50 is loaded from the CPU 12 to the GPU 16 via the 3D API 24.

At block 210, utilizing the key 79 of the identified GPU program 72, the image processing application 18 proceeds to initialize the attributes and variables of the GPU program 72 on the GPU 16.

At block 212, the GPU 16 proceeds to render the instance of image element data 50 in accordance with the GPU program 72, which operationally programs and executes on the GPU 16.

At decision block 214, a determination is made as to whether further instances of image element data 50 are stored in the sorted list 46 for dispatch to the GPU 16 from the CPU 12. If so, the method 200 then loops back to block 202. If not, then the method 200 may terminate at block 216.

As noted above, the GPU program 72 associated with each instance of image element data 50 may operate to apply one or more effects to the rendering of the relevant image element. Such effects may include motion blur, trackmattes, and lighting or shadowing. Further, the GPU program 72 may operate to composite the image element in accordance with a compositing (or blending) mode specified for the image element.

For example, considering first the motion blur effect, the GPU program 72 may use an approximation technique to avoid rendering each image element multiple times into an accumulation buffer. In one example embodiment, at each vertex of an image element, a vector representing the motion of that vertex over the shutter angle is computed. This vertex may then be transformed by the inverse of the model-view matrix in a vertex shader 74, which forms part of the GPU program 72. The transformed vector may then be passed to a fragment shader 76, also forming part of the GPU program 72, as a varying variable. Scaled versions of the vector may be used in the fragment shader as offsets to the texture sampler, and the resultant texture samples summed. In the event there is no motion blur, the texture coordinates of the image element are used to sample the image. These techniques may produce artifacts with fast rotations and perspective changes. However, one advantage of this technique is that only a single varying variable is passed to the fragment shader 76 of the GPU program 72. In contrast, passing a series of points for the fragment shader 76 to sample may result in the consumption of precious resources.

Turning to an example in which a "trackmatte" effect is specified by the GPU program 76, in one embodiment a trackmatte to an image element may be a layer that modifies an alpha channel of the original image element (e.g., an original image layer). The modifying layer and the original layer, as an example of an image element, may be rendered into buffers that are the size of a viewport. With respect to the examples discussed above, the CPU 12 may pass the texture and texture coordinates of the vertices of the trackmatte to the vertex shader 74 of the GPU program 72. The coordinates are calculated, in one embodiment, in the same manner as the background coordinates are calculated. These coordinates are passed to the fragment shader 76 of the GPU program 72, which uses a projective texture sampler to obtain the color and alpha channel of the trackmatte. The fragment shader 76 uses the trackmatte channels to modify the alpha channel of the foreground layer. Exemplary operations can be a simple replace, an inversion or replace, or the alpha can be calculated from the luminosity of the trackmatte.

The GPU program 72 may also implement lighting and/or shadowing with respect to an image element. In one embodiment, there may be many lights (e.g., a typical OpenGL implementation can have up to eight lights). Each light has a separate vertex shader 74 and fragment shader 76 embodied within the GPU program 72, in one example embodiment. Additional uniform and attribute variables are passed to the vertex and fragment shaders 74 and 76 of the GPU program 72 to handle specialized lighting functions. Shadows may be implemented utilizing shadow maps, which, in one example embodiment, comprise textures that contain depth information for a scene from a perspective of a viewing point.

In one exemplary embodiment, where the assembler module 22 includes strings corresponding to subroutines for each light of multiple lights in a particular scene, the assembly module 22 may track a number of texture coordinate processing units (e.g., a sub-component of an texture processing unit that also includes an texture image processing unit) of the video memory 40 of the GPU 16 that are in use. In this case, the assembler module 22 may stop computing shadows for those light sources that will force the use of more texture coordinate processing units of the video memory 40 than are available at a current time, or that are estimated to be available at a time of rendering of an associated image element.

The number of texture coordinate processing units of the video memory 40 of the GPU that are in use may be tracked in any number of ways. For example, the application 18 may query the GPU 16 for a maximum number of texture coordinate processing units. Further, the application 18 is aware of how many texture coordinate processing units are being consumed by a loaded GPU program 72. For example, the application 18 may assume that a single texture coordinate processing unit is being used to each of foreground and background layers. Processing of a trackmattes may consume a single texture coordinate processing unit, and between 0-2 texture coordinate processing units may be consumed for each light, depending on whether the light casts shadows, as monochrome shadows, or chromatic shadows. On detecting that the maximum number of texture coordinate processing units of the GPU 16 is being utilized, the application 18 may stop processing shadows, but still continue processing lights as if they had no shadows. There are of course other variables that consume texture coordinate processing units (e.g., the vertex attributes of motion, eye position, depth of field etc.). The application 18 may count the consumption of texture coordinate processing units from the maximum prior to beginning the count for shadows. The number of texture coordinate processing units that are consumed by a particular GPU program 72 is discernible from the key 79 of the GPU program 72.

Turning now to the compositing of an image element, in one example, the last step in the rendering of a three-dimensional scene may be the blending of the background color with a currently computed foreground color. Before rendering starts, the portion of the frame buffer 38 that will be covered by a current image element is copied to a texture processing unit of the video memory 40. The texture coordinates of the background image are computed for each foreground vertex by transforming the vertex utilizing a model-view matrix and a projection matrix. This results in normalized device coordinates. These coordinates are then transformed to texture coordinates by a scale and a translate. The coordinates are again translated to the origin to account for the texture being smaller than the viewport.

A vertex shader 74 for a compositing operation passes the vertex texture coordinates for the background image. The fragment shader 76 of the GPU program 72 on the other hand has a responsibility for more operations. In one embodiment, it may be assumed that the color channels of the frame buffer 38 are stored without being matted by a neutral color for a blending operation. The fragment shader 76, in this example, samples the background texture, mattes that color with the appropriate background color, applies a blending equation for the relevant compositing (or blending) mode and finally demattes the image element utilizing a neutral color.

An exemplary technique for utilizing both a CPU 12 and a GPU 16 to accelerate the compositing of a three-dimensional image has been described above. In one embodiment, additional image elements are generated (e.g., by splitting 10 more original image elements) for inclusion within a rendered three-dimensional image. Specifically, certain original image elements (e.g., obscuring image elements) may be split to thereby generating an enlarged set of image elements. This enlarged set of image elements may then be partially sorted (e.g., by obscurity). Image elements that do not obscure other image elements from a viewing point 154 may be stored at the head of a sorted list of image elements, without incurring the overhead of a split operation. The order in which the image elements are stored, and accordingly rendered, may be such that if a pixel from one image element is behind another pixel on another image element, such a pixel will be rendered first.

In one embodiment, the next step is to build shadow maps if necessary.

In an exemplary embodiment, as a next step, on the CPU, a GPU program (e.g., shader) is assembled for each image element. The GPU program may be constructed to compute any one of a number of effects applicable to the image element (e.g., motion blur, trackmatte and lighting effects). The same GPU program may also be constructed to blend a resultant color of the image element with a background color, according to a compositing (or blending) mode specified for the image element.

The GPU program is loaded from the CPU to the GPU, and the image element then rendered (e.g., utilizing OpenGL methods). Once the GPU program is loaded onto the GPU, it is stored there. Accordingly, it will be appreciated that the GPU program does not need to be transferred each time it is required for the rendering of an image element. Specifically, the CPU keeps track of which GPU programs have been loaded to the GPU, and is able to simply activate a GPU program that is already stored on the GPU. In one embodiment, this exemplary technique may provide the advantage of rendering each layer just once, accordingly delivering accelerated rendering speeds.

Figure 9:
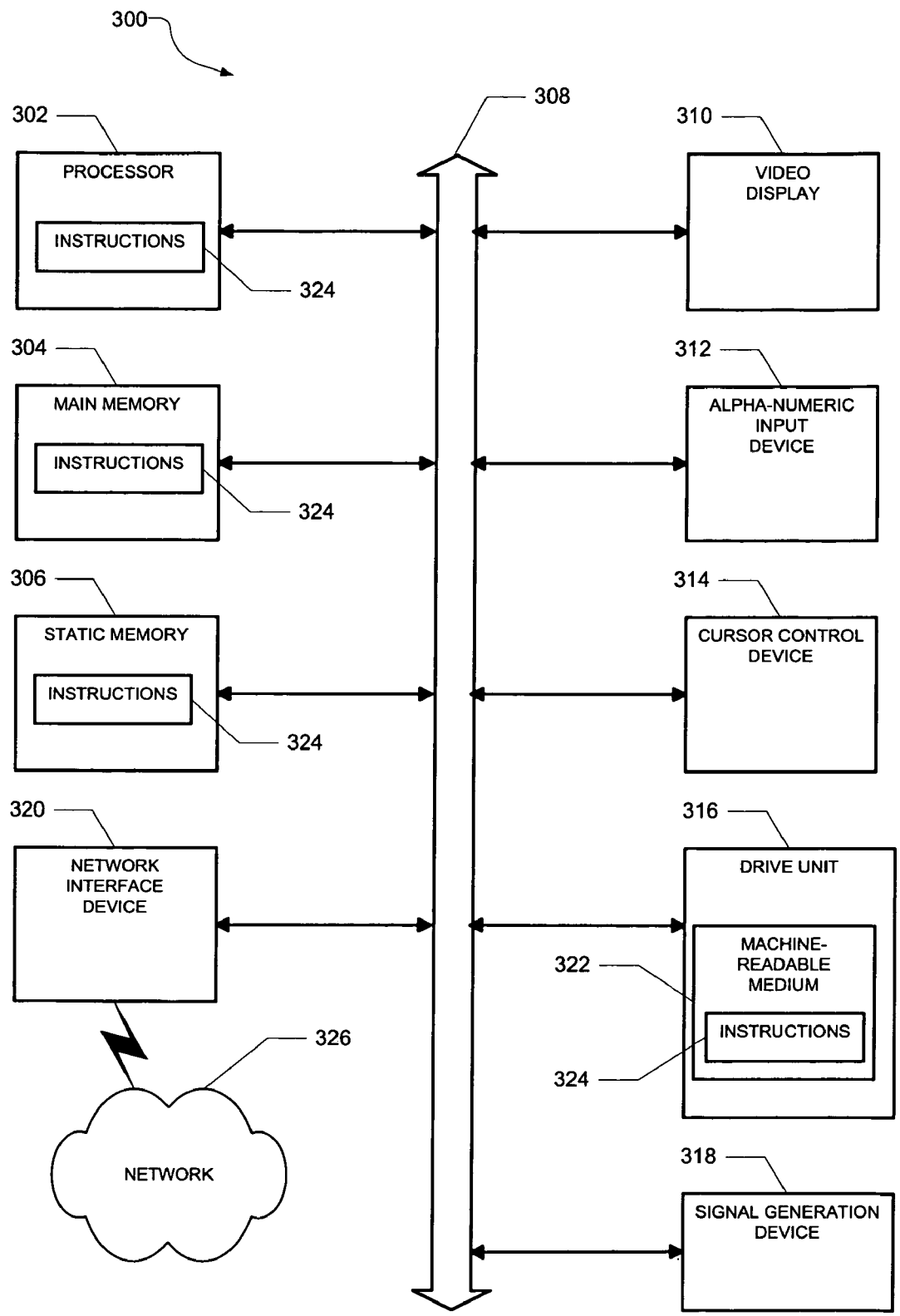
FIG. 9 shows a diagrammatic representation of machine in the exemplary form of a computer system within which a set of instructions, for causing the machine to perform any one or more of the methodologies discussed herein, may be executed.

FIG. 9 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 one or more processors 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of embodying, a storing, encoding or carrying a set of instructions for the execution by the machine and that cause the machine to perform any one or more of the methodologies described above, or that is capable of storing, encoding or carrying data structures utilized by or associated with such a set of instructions. The term "machine-readable medium" shall accordingly be taken to include, but not be limited to, solid-state memories, and optical and magnetic media.

In the description, numerous specific details such as logic implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A number of figures show block diagrams of systems and apparatus for software, in accordance with some embodiments of the invention. A flow diagram illustrates the operations for software, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. Therefore, the specification and drawings are to be regarded in an illustrative rather than a restrictive sense.

What is claimed is:

1. A system comprising:
    an assembler to execute on a central processing unit (CPU) and, for each image element of a first plurality of image elements to be rendered as part of a digital image:
    to identify at least one effect applicable to the respective image element;
        to select a first effect code for the at least one effect from a collection of effect codes; and
        to automatically generate a graphics processing unit (GPU) program to include the first effect code, the GPU program to apply the at least one effect to the respective image element and to composite the respective image element according to a compositing mode specific to the respective image element; and an interface to communicate the first plurality of image elements, and the GPU programs, from the CPU to a GPU.

2. The system of claim 1, wherein the GPU program is a shader program.

3. The system of claim 1, wherein the assembler is to generate at least one parameter value for the first effect code, and to associate the at least one parameter value for the first effect code with the GPU program.

4. The system of claim 1, wherein the assembler is to identify a plurality of effects applicable to a respective image element, to select a plurality of corresponding effect codes for the collection of effect codes, and to include each of the plurality of effect codes in the GPU program in a determined order.

5. A method comprising:
on a central processing unit (CPU), for each image element of a first plurality of image elements to be rendered as part of a digital image:
identifying at least one effect applicable to the respective image element;
selecting a first effect code for the at least one effect from a collection of effect codes; and
automatically assembling a graphics processing unit (GPU) program to include the first effect code, the GPU program to apply the at least one effect to the respective image element and to composite the respective image element according to a compositing mode specific to the respective image element; and
communicating the first plurality of image elements, and the respective GPU programs, from the CPU to a GPU.

6. The method of claim 5, including, on the GPU, rendering each of the image elements of the first plurality of image elements utilizing a respective GPU program.

7. The method of claim 5, wherein the automatic assembling of the GPU program includes generating at least one parameter value for the first effect code, and associating the at least one parameter value for the first effect code with the GPU program.

8. The method of claim 5, wherein the automatic assembling of the GPU program includes identifying a plurality of effects applicable to respective image element, selecting a plurality of corresponding effect codes for the collection of effect codes, and including each of the plurality of effect codes in the GPU program in a determined order.

9. The method of claim 5, including automatically assembling the GPU program dynamically and in response to an identification of the respective image element for rendering by the GPU.

10. A machine-readable medium embodying a series of instructions that, when executed by a machine, cause the machine to perform the method of claim 5.

11. A system comprising:
a first sort module to perform a first sort operation with respect to a plurality of image elements of a three-dimensional digital image, the first sort operation being based on relative obscurity among the plurality of image elements;
a second sort module to perform a second sort operation with respect to the plurality image elements, the second sort module to utilize a Binary Space-Partitioning (BSP) tree algorithm; and
a rendering module to apply at least one effect applicable to the respective image element.

12. The system of claim 11, wherein the first sort module is to construct a topological graph, and to populate the topological graph with nodes corresponding to each image element of the plurality of image elements.

13. The system of claim 12 including, within the topological graph, identifying nodes as being connected based on an obscurity relationship between the nodes.

14. The system of claim 11, wherein the second sort module, prior to performing the second sort operation, is to identify a subset of the plurality of image elements that intersect and, utilizing a root plane of the BSP tree algorithm, to split at least one image element of the subset so as to expand a number of image elements included within the plurality of image elements.

15. The system of claim 11, wherein the first and second sort operations are performed on a CPU, and the apparatus is to identify a first image element of the plurality of image elements for rendering by a GPU associated with the CPU.

16. A method comprising:
identifying a plurality of the image elements to be included in a three-dimensional digital image to be rendered by a processor;
performing a first sort operation with respect to the plurality of image elements based on obscurity among the plurality of image elements;
performing a second sort operation with respect to the plurality of image elements, the second sort operation utilizing a Binary Space-Partitioning (BSP) tree algorithm; and
applying at least one effect applicable to the respective image element.

17. The method of claim 16, wherein the first sort operation includes constructing a topological graph, and populating the topological graph with nodes corresponding to each image element of the plurality of image elements.

18. The method of claim 17 including, within the topological graph, identifying nodes as being connected based on an obscurity relationship between the nodes.

19. The method of claim 16 including, prior to performing the second sort operation, identifying a subset of the plurality of image elements that intersect and, utilizing a root plane of the BSP tree algorithm, splitting each image element of the subset so as to expand a number of image elements included within the plurality of image elements.

20. The method of claim 16, wherein the first and second sort operations are performed on a CPU, and the method includes identifying a first image element of the plurality of image elements for rendering by a GPU coupled to the CPU.

21. A machine-readable medium embodying a series of instructions that, when executed by a machine, cause the machine to perform the method of claim 16.

22. A system comprising:
first means for performing a first sort operation with respect to a plurality of image elements of a three-dimensional digital image, the first sort operation being based on relative obscurity among the plurality of image elements;
second means for performing a second sort operation with respect to the plurality of image elements, the second sort means utilizing a Binary Space-Partitioning (BSP) tree algorithm;
third means for execution on a central processing unit (CPU) and, for each image element of a first plurality of image elements to be rendered as part of a digital image:
for identifying at least one effect applicable to the respective image element;

for selecting a first effect code for the at least one effect from a collection of effect codes; and to automatically generate a graphics processing unit (GPU) program to include the first effect code, the GPU program for applying the at least one effect of the respective image element and for compositing the respective image element according to a compositing mode specific to the respective image element; and fourth means for communicating the first plurality of image elements, and the GPU programs, from the CPU to a GPU.

* * * * *